United States Patent [19]
Sato et al.

[11] Patent Number: 5,464,490
[45] Date of Patent: Nov. 7, 1995

[54] PROCESS FOR MANUFACTURING LIQUID CRYSTAL DISPLAY

[75] Inventors: Kazuhito Sato; Yuji Negishi, both of Hamura, Japan

[73] Assignee: Casio Computer Co., Ltd., Tokyo, Japan

[21] Appl. No.: 174,156

[22] Filed: Dec. 27, 1993

[30] Foreign Application Priority Data

Aug. 18, 1993 [JP] Japan .................................. 5-223915
Sep. 22, 1993 [JP] Japan .................................. 5-257493

[51] Int. Cl.$^6$ .................................................. B32B 31/00
[52] U.S. Cl. ........................ 156/145; 156/252; 156/263; 156/292; 156/308.4
[58] Field of Search ...................................... 156/145, 292, 156/250, 252, 263, 308.4; 428/1; 359/80, 82

[56] References Cited

U.S. PATENT DOCUMENTS

| | | | |
|---|---|---|---|
| 4,011,001 | 3/1977 | Moriya | 428/1 |
| 4,094,058 | 6/1978 | Yasutake et al. | 359/80 |
| 4,455,185 | 6/1984 | Sasaki et al. | 156/250 |
| 4,597,636 | 7/1986 | Hoshikawa | 428/1 |
| 4,709,991 | 12/1987 | Hoshikawa | 428/1 |

FOREIGN PATENT DOCUMENTS

| | | |
|---|---|---|
| 55-65933 | 5/1980 | Japan . |
| 56-92515 | 7/1981 | Japan . |
| 60-178424 | 9/1985 | Japan . |
| 2-64523 | 3/1990 | Japan . |
| 3-138615 | 6/1991 | Japan . |
| 4-80719 | 3/1992 | Japan . |

*Primary Examiner*—Michael W. Ball
*Assistant Examiner*—Richard Crispino
*Attorney, Agent, or Firm*—Frishauf, Holtz, Goodman, Langer & Chick

[57] ABSTRACT

A process for manufacturing a liquid crystal display, comprising the steps of providing a first base plate of a resin and a second base plate of a resin, providing at least one of the base plates with an electrically connecting terminal, forming an opening in a base plate of the base plates opposite the electrically connecting terminal when the base plates are bonded to each other, providing at least one of the base plates with a seal, bonding the base plates to each other by means of the seal, providing a space between the base plates with a liquid crystal, and separating the base plates on a line adjoining an edge of the opening. The opening protects the connecting terminal from being physically damaged and separated at the separation step to improve the production yield of the display.

13 Claims, 7 Drawing Sheets

PROCESS FOR MANUFACTURING LIQUID CRYSTAL DISPLAY

BACKGROUND OF THE INVENTION

1. Field of the Invention

The present invention relates to a process for manufacturing a liquid crystal display.

2. Description of the Related Art

Liquid crystal displays comprise a structure in which two film substrates, opposite surfaces of which have transparent electrodes formed thereon, are bonded to each other by means of a seal placed on the peripheries of the film substrates to define a cell space and this cell space receives a liquid crystal. Some of such liquid crystal displays have one film substrate an end of which extends beyond the periphery of the other film substrate and has an electrically connecting terminal for use in an electrical connection to a device outside the liquid crystal display.

Processes for manufacturing such liquid crystal display comprise the steps of providing two elongate or sheet-shaped base films for providing a plurality of film substrates, forming transparent electrodes, forming a seal, subsequently bonding the two base films, subsequently separating cells formed of the two bonded base films from each other by means of a cutter and injecting a liquid crystal into a cell space defined by the base films and the seal.

In such a process for manufacturing a liquid crystal display, only one of the pair of base films must be separated with a cutter in order to obtain a plurality of liquid crystal displays. However, this separation is very difficult since an end of one of the film substrate pair of a liquid crystal display in the form of a final product extends from within the other film substrate and has the connecting terminal, the one end of the one film substrate, cut portions of the bonded base films have different shapes in part. In addition, since the base film is a thin film of a resin and a sufficient separation precision is not obtained, it is very difficult to separate only one of the two base films. Thus, a portion of the other base film having a connecting terminal is often cut to physically damage or cut out the connecting terminal. This is a cause of reducing the production yield of the liquid crystal display manufacturing process.

SUMMARY OF THE INVENTION

The present invention was made in view of the situation described above. An object of the present invention is to provide a process for manufacturing a liquid crystal display which prevents an electrically connecting terminal from being physically damaged and cut out, to improve the production yield of the liquid crystal display.

In order to achieve the object, the present invention comprises the steps of providing a first base providing the first base plate with an electrical connecting terminal adapted to be connected to a device external to the liquid crystal display, forming an opening in the second base plate, corresponding to the electrical connecting terminal of the first base plate, and providing at least one of the first and the second base plates with a seal. The first and the second base plates are bonded to each other by means of the seal so that the electrical connecting terminal is exposed through the opening. A liquid crystal is injected between the first and the second base plates, and the first and second base plates are cut on a line adjoining an edge of the opening.

Other objects, features and advantages of the present invention will be apparent from a consideration of the following description, taken in connection with the accompanying drawings.

DETAILED DESCRIPTION OF THE PREFERRED EMBODIMENT

An embodiment of the present invention will be described with reference to the drawings hereinafter.

Figure 2:
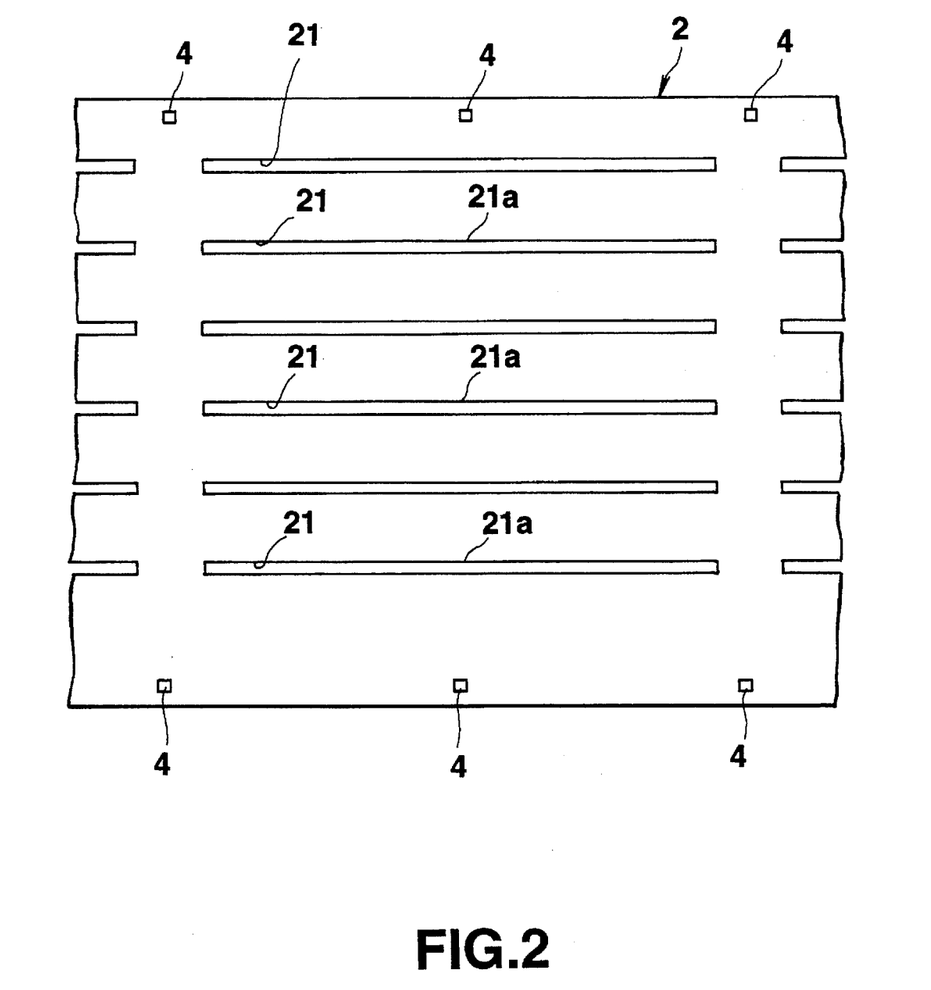
FIG. 2 is a plan view of part of a front base film for a liquid crystal display manufactured by a process for manufacturing a liquid crystal display according to the embodiment.
Figure 3A:
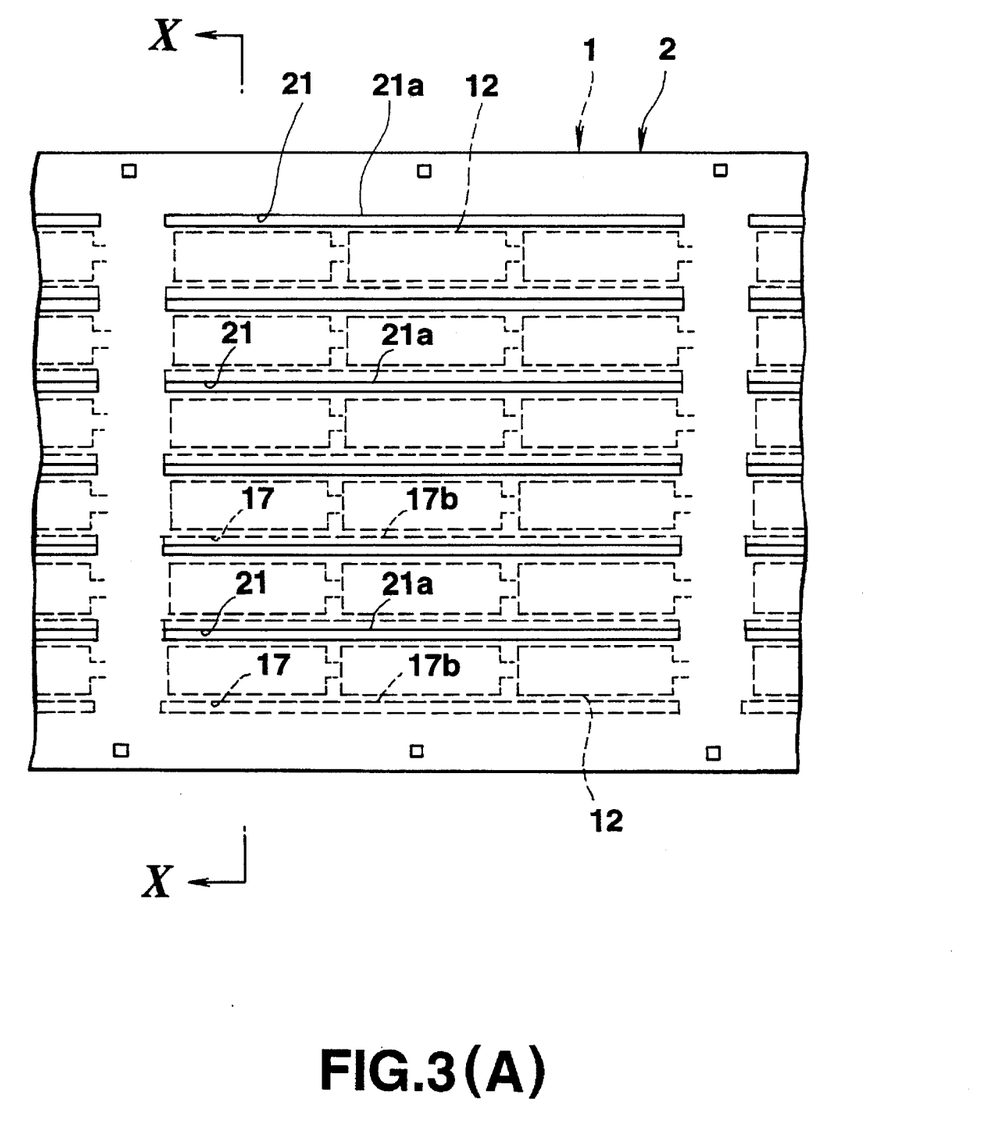
FIG. 3(A) is a plan view of the base films of FIGS. 1 and 2 bonded by means of a seal.
Figure 3B:
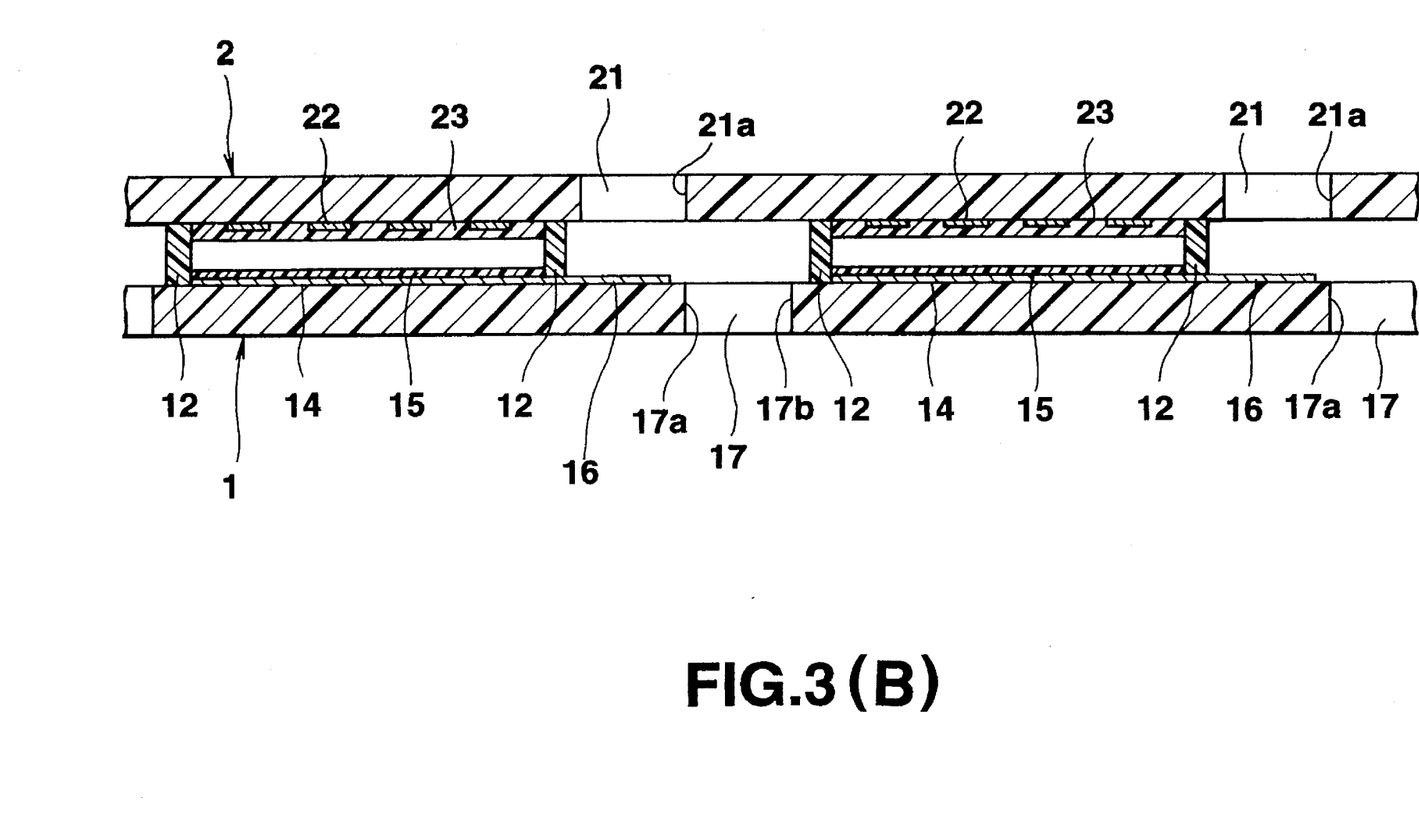
FIG. 3(B) is a cross-sectional view taken along Line X—X in FIG. 3(A)

First, a rear base film 1 (see FIG. 1) for providing a plurality of rear film substrates or base plates and a front base film 2 for (see FIG. 2) providing a plurality of front film substrates or base plates are provided. The base films 1 and 2 are elongate (or relatively large sheet-shaped) thin films of a synthetic resin such as polyethyleneterephthalate, polyethersulfone or polyimide. The opposite sides of the base films 1 and 2 have rows of sprocket holes 3 and 4. An upper surface of a predetermined area of the rear base film 1 has a plurality of arrays of 18 seals 12 of a thermosetting resin printed thereon. Each array comprises 6 (along the width)×3 (along the longitudinal axis) seals 12. A liquid crystal injection inlet 13 is provided at one end (in FIG. 1, a right end) of each seal 12. Prior to printing the seals 12, transparent electrodes 14 of indium tin oxide (ITO) are patterned on the upper surface of the predetermined area of the rear base film 1, as shown in FIG. 3(B). An orientation film 15 of, e.g., polyimide is formed on each transparent electrode 14 and processed so as to have a predetermined orientation performance. As shown in FIG. 3(B), a connecting terminal 16 is patterned on the upper surface of a portion of the predetermined area of the rear base film 1 adjoining a right side of each seal 12 (i.e. an upper side of each seal 12 in FIG. 1).

On the other hand, the front base film 2 has arrays of six punched out slit openings 21 extending along the longitudinal axis of the front base film 2 and arrayed along the width of the front base film 2 so that the slits 21 are opposite to portions having the connecting terminals 16. Prior to or after forming the slits 21, front transparent electrodes 22 of, e.g., ITO, are patterned on the underside of the front base film 2, as shown in FIG. 3(B). Opposite each rear transparent electrode 14, an orientation film 23 is formed on the undersides of the front transparent electrodes 22 and the front base film 2. The orientation films 23 are processed so as to have a predetermined orientation performance. Predetermined portions of the underside of the front base film 2 have cross members (not shown) of, e.g., printed silver paste electrically connecting the front base film 2 to the rear base film 1.

Figure 1:
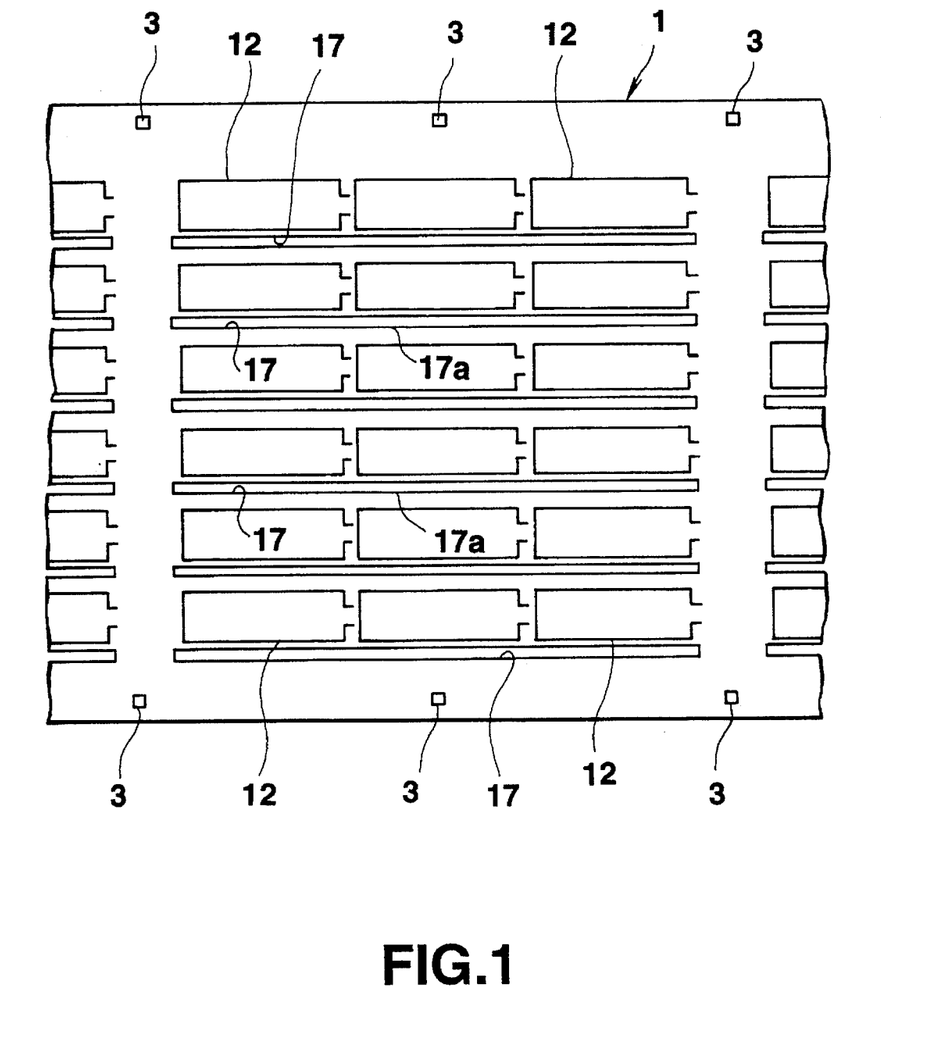
FIG. 1 is a plan view of part of a rear base film for a liquid crystal display manufactured by a process for manufacturing a liquid crystal display according to an embodiment of the present invention.

In addition, six predetermined portions along the width of the rear base film 1 (i.e., a portion adjacent to the lower side of each seal 12 in FIG. 1, i.e., a portion adjacent to the left side of each seal 12 in FIG. 3(B)) have slits openings 17 punched out and extending along the longitudinal axis of the base film 1.

The width and the length of each slit 17 are equal to those of a corresponding slit 21 in the front base film 2. In addition, the lower edge 17a of that slit 17 aligns with and is opposite to the upper side edge 21a of the corresponding slit 21, as shown in FIG. 3(B).

Figure 4:
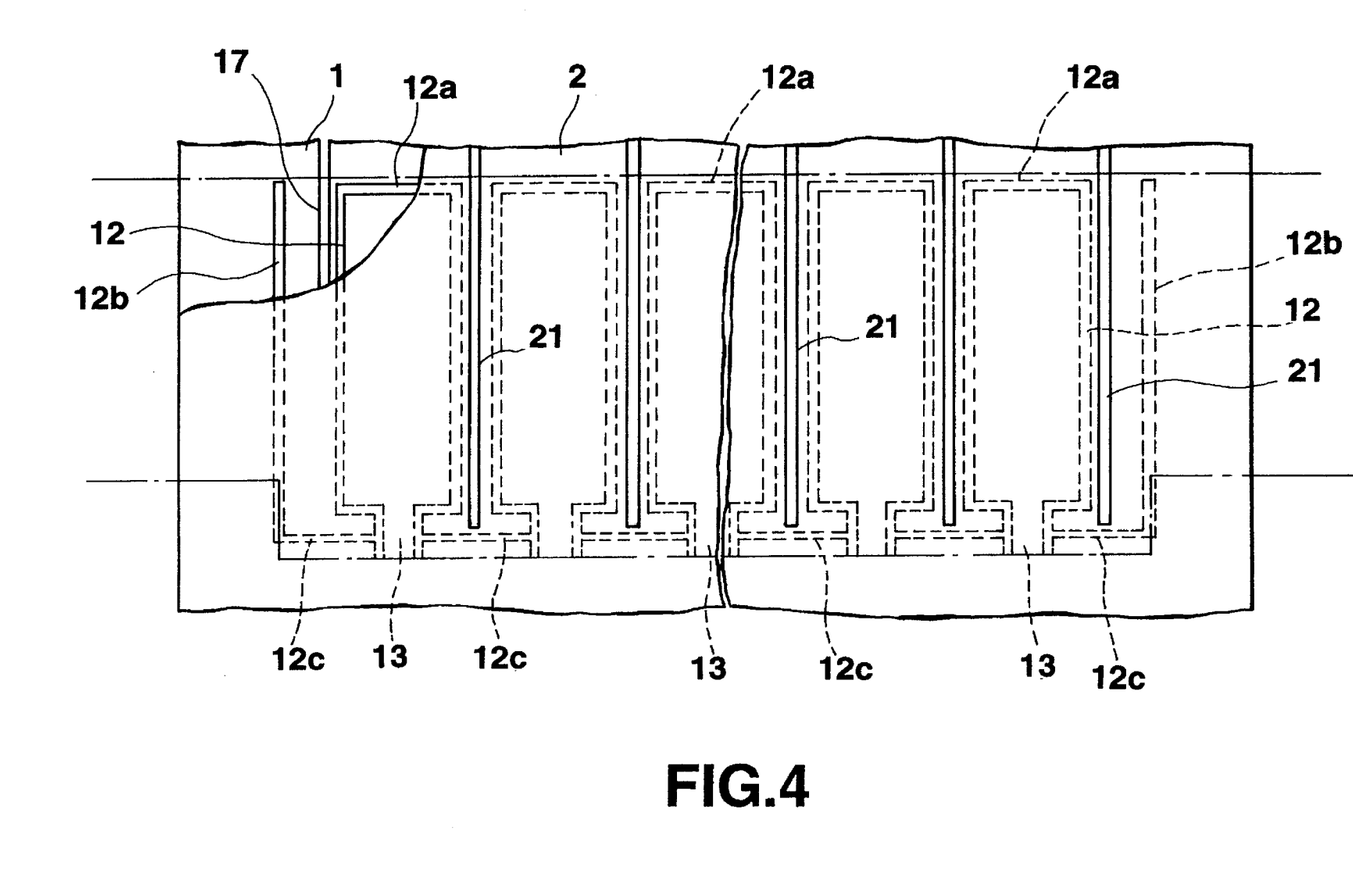
FIG. 4 is an enlarged view of part of FIG. 3(A)

FIG. 4 shows the shapes and the arrangement of the seals 12 in detail. In the predetermined area in the rear base film 1, liquid crystal cell seals 12a each surround display areas. First seals 12b for blocking a liquid crystal invasion extend along the outermost liquid crystal cell seals 12a outside each column of the liquid crystal cell seals 12a with spacings. The first seals 12b for blocking the liquid crystal invasion extend along the longitudinal axis of the rear base film 1 transversely to the column of the liquid crystal cell seals 12a. As shown in FIG. 4, second liquid crystal invasion blocking seals 12C extend from the centers of the length of the liquid crystal injection inlets 13 and the lower ends of the first liquid crystal invasion blocking seals 12b along the width of the rear base film 1 on the upper surface of the rear base film 1 between adjacent liquid crystal injection inlets 13 and between the outermost liquid crystal injection inlets 13 and the lower ends of the first liquid crystal invasion blocking seals 12b.

After provision of the rear base film 1 and the front base film 2, particulate spacers (not shown) are sprayed into cell spaces surrounded by the seals 12, if necessary. Subsequently, the front base film 2 is laid over the rear base film 1 by means of the seal 12 so that the connecting terminals 16 are exposed to the atmosphere through the slits 21 in the front base film 2, as shown in FIGS. 3(A) and 3(B). Subsequently, the seal 12 is heat treated to be hardened to bond the front base film 2 to the rear base film 1. Since the base films 1 and 2 have the same number of slits 7 and 21 with the same width and the same length, the base films 1 and 2 have substantially the same coefficient of thermal expansion. Therefore, the heat treatment of an assembly of the seal 12 and the base films 1 and 2 cannot warp the base films 1 and 2 bonded to each other to eliminate a drawback from the warpage of the base films 1 and 2.

The base films 1 and 2 are separated on upper and lower alternate long and short dash lines shown in FIG. 4. As shown in FIG. 4, the upper alternate long and short dash line passes through a portion spaced from the upper side of the liquid crystal seal 12a. The lower alternate long and dash lines pass through the lower edges of the liquid crystal injection inlets 13 between the opposite first liquid crystal invasion blocking seals 12b and through a portion spaced upwards from the upper edges of the liquid crystal injection inlets 13 outside the opposite the first liquid crystal invasion seals 12b transversely to the longitudinal axes of the base films 1 and 2. The lower alternate long and short dash lines also pass through the center of the width of each first liquid crystal invasion blocking seal 12b.

Figure 5:
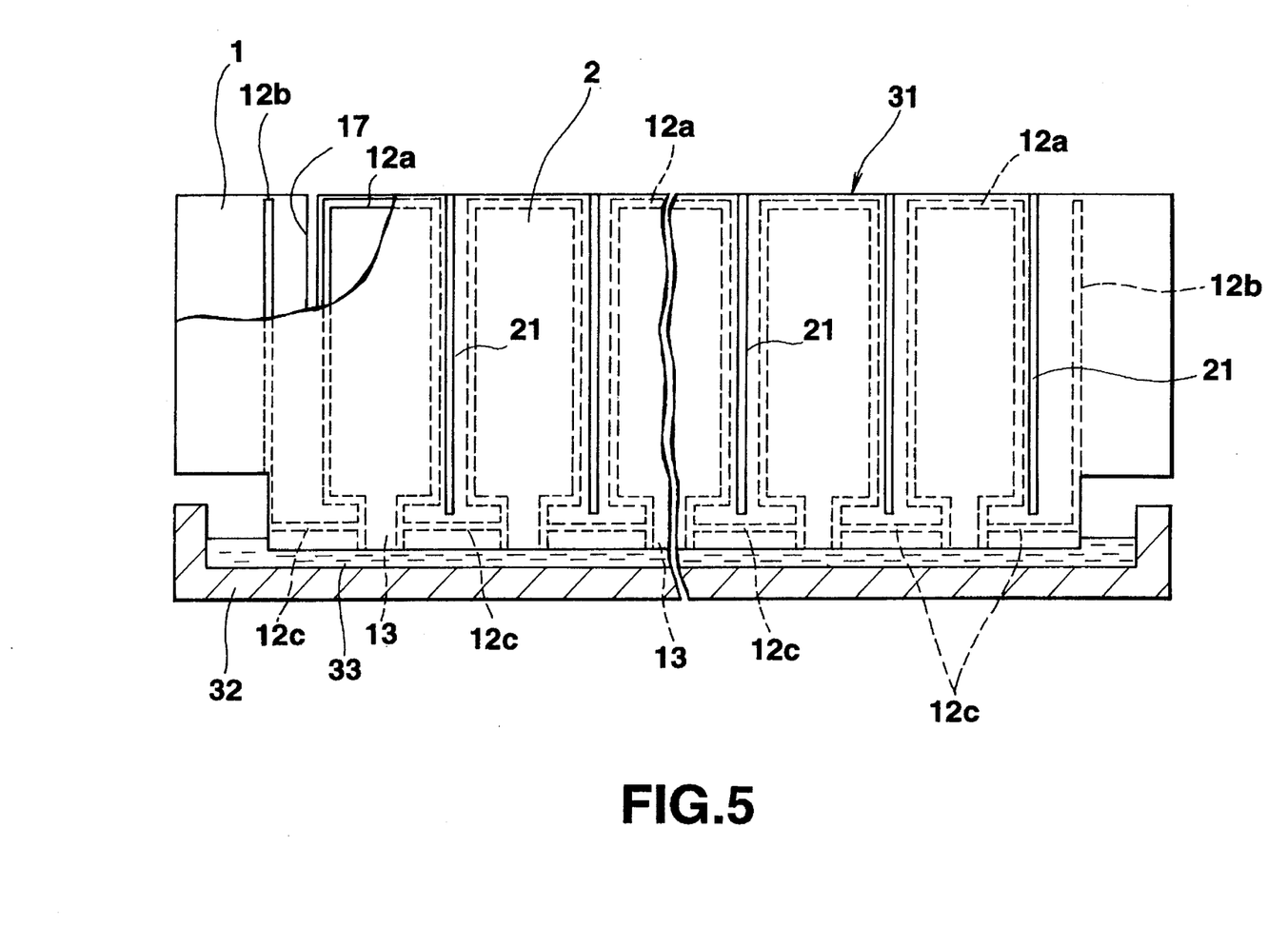
FIG. 5 is a sectional view illustrative of a condition in which a liquid crystal is injected into a cell space defined by the base films and the seal.

Thus, a liquid crystal cell blank assembly 31 which is shown in FIG. 5 is obtained. The separation of the base films 1 and 2 is performed by a single stroke of a punch or a cutter providing the cut section indicated by the alternate and short dash lines shown in FIG. 4.

A liquid crystal injection will be described with reference to FIG. 5 hereinafter. First, the liquid crystal cell blank assembly 31 is placed in a vacuum vessel (not shown). Subsequently, an evacuation of the interior of the vacuum vessel evacuates the cell spaces defined by the liquid crystal cell seals 12a and the base films 1 and 2 via the liquid crystal injection inlets 13. Subsequently, the lower end of the liquid crystal cell blank assembly 31, i.e., the lower ends of the liquid crystal injection inlets 13 are immersed in the liquid crystal 33 held in a liquid crystal vessel 32 placed in the vacuum vessel. Subsequently, the interior pressure in the vacuum vessel is increased to the atmospheric pressure to inject the liquid crystal 33 out of the liquid crystal vessel 32 into the cell spaces via the liquid crystal injection inlets 13. Finally, the liquid crystal cell blank assembly 31 is taken out of the vacuum vessel.

Since the liquid crystal injection inlets 13 are immersed in the liquid crystal 33 held in the liquid crystal vessel 32, the second liquid crystal invasion seals 12c block the liquid crystal 33 from invading by capillarity each space defined by adjacent liquid crystal cell seals 12 and the base films 1 and 2 even if the liquid crystal 33 inadvertently sticks to the interior surfaces of portions of the base films 1 and 2 adjoining the liquid crystal injection inlets 13. In addition, since the lower ends of the opposite sides of the liquid crystal cell blank assembly 31 are separated at the center of the width of each outermost first liquid crystal invasion blocking seal 12b, this arrangement of the liquid crystal cell blank assembly 31 eliminates the invasion of the liquid crystal 33 by capillarity to a spacing between the base films 1 and 2 outside the first liquid crystal invasion blocking seals 12b.

Thus, the arrangement of the liquid crystal cell blank assembly 31 can block the liquid crystal 33 from inadvertently sticking to the interior surfaces of the portions of the base films 1 and 2 outside the liquid crystal cell seals 12a. This greatly saves an amount of the expensive liquid crystal 33 used to reduce a manufacturing cost of the liquid crystal display. The first liquid crystal invasion blocking seals 12b also prevent the opposite sides of the base films 1 and 2 from peeling off each other.

Figure 6:
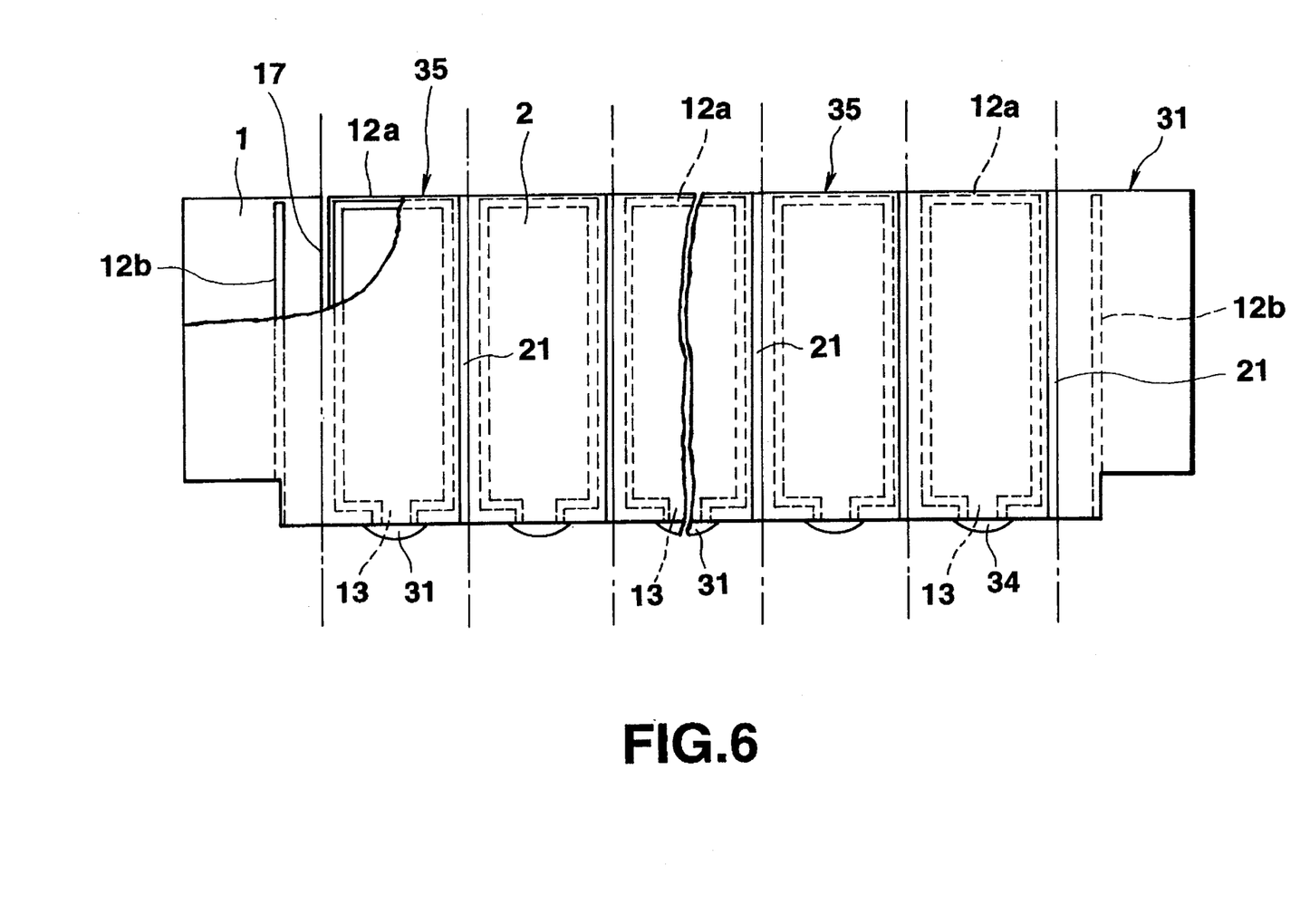
FIG. 6 is a sectional view illustrative of a condition in which the liquid injection inlet is sealed by a sealer.

Subsequently, the liquid crystal cell blank assembly 31 is separated on a line passing through the lower ends of the slits 21 to separate a portion including the second liquid crystal invasion seals 12c from the other portion of the liquid crystal cell blank assembly 31, as shown in FIG. 6. Subsequently, all the liquid crystal injection inlets 13 are sealed by a sealer 34. Subsequently, the liquid crystal cell blank assembly 31 is separated on alternate long and short dash lines into a plurality of liquid crystal cells as shown in FIG. 6. That is, the separation lines, as shown in FIG. 6, pass a predetermined portion adjoining the left side edge of a left liquid crystal seal 12 and the right side edges of the slits 21. Thus, a portion including the first liquid crystal invasion blocking seals 12b is eliminated from the other portion of the liquid crystal cell blank assembly 31. Thus, liquid crystal cells 35 are produced.

Since at the final separation step the base films 1 and 2 are separated on the lines in contact with the slits 21 avoiding the connecting terminals 16, no separation lines pass through the connecting terminals 16. Thus, the inventive process blocks the connecting terminals 16 from being physically damaged and fully separated, to improve the production yield of the liquid crystal display.

The present invention is not rigidly restricted to the embodiment described above. It is to be understood that a person skilled in the art can easily change and modify the present invention without departing from the scope of the invention defined in the appended claims.

What is claimed is:

1. A process for manufacturing a liquid crystal display, comprising the steps of:

providing a first base plate of a resin and a second base plate of a resin;

providing the first base plate with an electrical connecting terminal adapted to be connected to a device external to the liquid crystal display;

forming an opening in the second base plate corresponding to the electrical connecting terminal of the first base plate, a size of the opening being in correspondence to a portion having the electrical connecting terminal of said first base plate;

providing at least one of the first and the second base plates with a seal, the seal comprising a liquid crystal cell seal surrounding a display area and a blocking seal obstructing a liquid crystal invasion into an area outside the liquid crystal cell seal;

bonding the first and the second base plates to each other by means of the seal so that the electrical connecting terminal is exposed through the opening:

injecting a liquid crystal between said first and said second base plates;

eliminating a portion of said first and said second base plates including the blocking seal from another portion including the liquid crystal cell seal; and cutting said first and said second base plates on a line adjoining an edge of the opening.

2. The process as recited in claim 1, further comprising:

forming another opening in the first base plate, the another opening having the same shape of the opening formed in the second base plate.

3. The process as recited in claim 2, wherein said cutting step is subsequent to said injecting step.

4. The process as recited in claim 3, wherein the seal is made of a thermosetting resin.

5. The process as recited in claim 2, wherein the seal is made of a thermosetting resin.

6. A process for manufacturing a liquid crystal display, comprising the steps of:

providing a first base plate of a resin and a second base plate of a resin;

providing the first base plate with an electrical connecting terminal adapted to be connected to a device external to the liquid crystal display;

forming a first opening in the first base plate adjacent to the electrical connecting terminal, a size of the first opening being in correspondence to a portion having the electrical connecting terminal of the first base plate;

forming a second opening in the second base plate corresponding to the electrical connecting terminal of the first base plate, a size of the second opening being in correspondence to the portion having the electrical connecting terminal of said first base plate;

providing at least one of the first and the second base plates with a seal;

bonding the first and the second base plates to each other by means of the seal so that the electrical connecting terminal is exposed through the second opening:

injecting a liquid crystal between the first and the second base plates; and cutting the first and second base plates on a line adjoining an edge of the second opening.

7. The process as recited in claim 1, wherein said cutting step is subsequent to said injecting step.

8. The process as recited in claim 7, wherein the seal is made of a thermosetting resin.

9. The process as recited in claim 6, wherein the seal comprises a liquid crystal cell seal surrounding a display area and a blocking seal obstructing a liquid crystal invasion into an area outside the liquid crystal cell seal.

10. The process as recited in claim 9, wherein said cutting step is subsequent to said injecting step.

11. The process as recited in claim 10, wherein the seal is made of a thermosetting resin.

12. The process as recited in claim 6, wherein said cutting step is subsequent to said injecting step.

13. The process as recited in claim 12, wherein the seal is made of a thermosetting resin.

* * * * *